US010417207B2

United States Patent
Qu

(10) Patent No.: US 10,417,207 B2
(45) Date of Patent: Sep. 17, 2019

(54) CASCADE COMPUTER NETWORK AND ITS ARCHITECTURE FOR MULTI-USER OPERATIONS

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 0 days.

(21) Appl. No.: 15/528,811

(22) PCT Filed: Mar. 16, 2017

(86) PCT No.: PCT/CN2017/076907
§ 371 (c)(1),
(2) Date: May 23, 2017

(87) PCT Pub. No.: WO2017/162088
PCT Pub. Date: Sep. 28, 2017

(65) Prior Publication Data
US 2019/0005076 A1 Jan. 3, 2019

(30) Foreign Application Priority Data

Mar. 21, 2016 (CN) .......................... 2016 1 0160313

(51) Int. Cl.
*G06F 16/22* (2019.01)
*G06F 9/50* (2006.01)
(Continued)

(52) U.S. Cl.
CPC ........ *G06F 16/2228* (2019.01); *G06F 9/5083* (2013.01); *G06F 16/00* (2019.01); *H04L 67/10* (2013.01); *H04L 67/22* (2013.01)

(58) Field of Classification Search
CPC ..... H04L 67/22; H04L 67/10; G06F 16/2228; G06F 16/00; G06F 9/5083;
(Continued)

(56) References Cited

U.S. PATENT DOCUMENTS 8,675,488 B1 3/2014 Sidebottom
2002/0078363 A1* 6/2002 Hill .................. G06F 3/002
713/189
(Continued)

*Primary Examiner* — Le H Luu
(74) *Attorney, Agent, or Firm* — SV Patent Service

(57) ABSTRACT

A multi-user operational cascade computer network includes an initiating computer and a plurality of user computers comprising a first user computer and an Nth user computer. A first data label is issued and transmitted by an originating computer. A first operation corresponding to a first task is executed by each user computer to generate and then store the execution data and generate an index. The first task is simultaneously cascaded. The subsequent user computers continue to generate nested datatags, so as to realize the function of each terminal to record the communications between the terminals in the specific application. The operation behavior of each user are recorded and reflected for the specific application, which facilitate follow-up data analyses and management, and big data applications. The disclosed multi-user operational cascade computer network and construction methods have a simple network structure, low application cost, and extensive range of applications.

20 Claims, 3 Drawing Sheets

(51) Int. Cl.
*H04L 29/08* (2006.01)
*G06F 16/00* (2019.01)

(58) Field of Classification Search
CPC ...... G06F 19/3462; G06F 21/32; G06F 3/002; G06F 8/65; G06K 7/10772; G06K 9/00536; G06Q 10/083; G06Q 10/08; G06Q 20/4016; G06Q 30/0185; G06Q 30/02; G06Q 30/0637
See application file for complete search history.

(56) References Cited

U.S. PATENT DOCUMENTS

| | | | |
|---|---|---|---|
| 2002/0154892 A1 | 10/2002 | Hoshen | |
| 2008/0048044 A1 | 2/2008 | Zhao | |
| 2010/0223663 A1* | 9/2010 | Morimoto | G06F 21/32 726/7 |
| 2011/0246336 A1* | 10/2011 | Callaghan | G06K 7/10772 705/27.2 |
| 2013/0282592 A1 | 10/2013 | Zambrana | |
| 2016/0086029 A1* | 3/2016 | Dubuque | G06K 9/00536 382/159 |
| 2016/0086255 A1* | 3/2016 | Sainfort | G06Q 30/0637 705/26.41 |
| 2016/0132659 A1* | 5/2016 | Vaz | G06F 19/3462 700/242 |
| 2016/0140497 A1* | 5/2016 | Bhaskaran | G06Q 10/083 705/337 |
| 2016/0189169 A1* | 6/2016 | Shah | G06Q 30/0185 705/318 |
| 2016/0267428 A1* | 9/2016 | Hodges | G06Q 10/08 |
| 2017/0046707 A1* | 2/2017 | Krause | G06Q 20/4016 |
| 2017/0094021 A1* | 3/2017 | Brech | G06F 8/65 |
| 2017/0300926 A1* | 10/2017 | Stout | G06Q 30/02 |

\* cited by examiner

CASCADE COMPUTER NETWORK AND ITS ARCHITECTURE FOR MULTI-USER OPERATIONS

BACKGROUND OF THE INVENTION

The present invention relates to the field of computer technology, and more particularly to the field of computer network technology, and more particularly to a cascade computer network for multi-user operations, and its associated architecture method.

With the continuous development and prosperity of the commercial market, the variety of goods is growing on the market. Various shopping malls, hotels, restaurants, and other services are beginning to develop their own club members in order to maintain customer royalty and development. Thus properly identifying membership has become a key issue. Membership cards are usually used, this method is more direct and convenient, but it also involves higher cost of issuing cards, more importantly, the membership card can be easily be borrowed by others. On the other hand, it is beneficial for members to recommend their business to friends and family, to facilitate exchanges and sharing among friends. An important problem remains to be solved to allow businesses to record such promotions, in order to facilitate the feedback and additional promotions.

In addition, collecting and managing the status of all commodities in the process of logistics and sales have also become an important issue in the current commodity sales process.

The most critical issue is that in the process when the goods are shipped from the factory production or warehouse storage to the store for sales, it is not only necessary to know the state information of the good sales, but also to grasp the package information in transport process package logistics. Conventionally, barcodes are usually printed on separately sold products, which allow bar code readers to obtain product information. The problem is that it is impossible to open all packages through the entire product logistics process to scan the bar code and gather information of each commodity, which would waste operation fees and labor costs, and have very low accuracy. Therefore, there is an urgent need for a commodity information data collection system for commodity logistics and sales that can effectively solve the above problems.

Thus, there is a need for a variety of computer terminals in a network to record and store the propagation and circulation of specific information in practical applications to encourage applications based on the recorded information in the computer network.

Data labels can be read from a specific device in the forms of are data tags, including NFC, RFID, bar code, and two-dimensional codes.

SUMMARY OF THE INVENTION

The purpose of the present invention is to overcome the above-mentioned disadvantages of the prior art, to provide a computer terminal capable of recording and storing the propagation and circulation process of a specific application in each user by using various computer terminals in the network and capable of recording and reflecting the operation behavior of each user for the specific application, facilitating the later data analysis and collation, And the late large data applications, and the structure is simple, low cost, wide range of applications Multi-user operation Concurrent network (cascade) computer network and its architecture.

To achieve the above objects, the presently disclosed cascade computer network system can include the following:

A multi-user cascade computer network includes an initiating computer and a plurality of user computers that includes at least a first user computer and an Nth user computer.

The initiating computer can issue a first datatag corresponding to a first task, wherein the first datatag includes at least an originating computer ID for the initiating computer and a first task ID for the first task.

The first user computer can identify the first datatag, to acquire the originating computer ID and the first task ID, to execute a first operation corresponding to the first task, to generate a first execution data, and to generate a second datatag, wherein the second datatag includes the originating computer ID, a first user computer ID for the first user computer, and the first task ID.

The Nth user computer can identify an N-th datatag, to acquire the originating computer ID, an N−1 computer ID, and the first task ID, to perform the first operation, to generate N-th execution data, wherein N is a integer greater than or equal to 2.

The multi-user cascade computer network can further include a first interface server configured to store first application service information corresponding to the first task and to provide the first application service information to the originating computer, the first user computer, and the Nth user computer through a network.

The first interface server can store the first user computer ID, first execution data, N-th computer ID, and N-th execution data.

The multi-user cascade computer network can further include a first control server configured to use first interface server to control the originating computer to publish the first datatag via the network.

The first control server can further generate and store a first operational index comprising at least the first user computer ID and the corresponding first execution data, and the Nth computer ID and the corresponding Nth execution data.

The first control server can further control the originating computer to suspend publication of the first datatag.

The first control server can further control the initiating computer to modify the first datatag.

The second datatag can further include first execution data, wherein the N-th datatag further comprises N−1-th execution data, wherein the N-th user computer can execute the first operation based on the N−1-th execution data and to generate N-th execution data.

The N-th datatag can further include at least one X-th execution data, wherein X is an integer equal to or greater than 1, wherein the N-th user computer can execute the first operation based on at least one of the X-th execution data and to generate N-th execution data.

The multi-user cascade computer network can further include an n-th user computer configured to identify the n-th datatag, to acquire the origination computer ID, the (n−1)th computer ID, and the first task ID, to execute a first operation corresponding to the first task, to generate n-th execution data and to generate an (n+1)-th datatag, the (n+1)-th datatag which includes at least the origination computer ID, n-th user computer ID, the first task ID, and the second task ID, wherein n is a integer greater than or equal to 2 and less than or equal to N.

An (n+1)-th user computer can identify the (n+1)-th datatag, to acquire the origination computer ID, the n-th computer ID, the first task ID, and the second task ID, to generate a first operation corresponding to the first task, to generate an (n+1)-th operation execution data, to execute a second operation corresponding to the second task, to generate an (n+1)-th second operation execution data, the (n+2)-th datatag, the (n+2)-th datatag which includes at least the origination computer ID, the first (n+1)-th user computer ID, the first task ID, and the second task ID.

A second interface server can store second application service information corresponding to the second task to provide the second application service information to the nth user computer and the (n+1)-th user computer through a network.

The multi-user cascade computer network can further include a second control server configured to control the originating computer to issue the second task ID through a network and using the second interface server, and to generate and store a second operational index, the second operation index comprising the (n+1)-th user computer ID and the corresponding the (n+1)-th first operation execution data, and the (n+2)th first operation execution data.

The present disclosure also describes a method for constructing a multi-user cascade computer network, which is a data exchange method that constructs the above described multi-user cascade computer network over the Internet.

The method can include the following steps:

(1) issuing a first datatag corresponding to a first task by an initiating computer, wherein the first datatag includes at least an originating computer ID for the initiating computer and a first task ID for the first task;

(2) identifying the first datatag by a first user computer, acquiring the originating computer ID and the first task ID, executing a first operation corresponding to the first task, generating a first execution data, and generating a second datatag, wherein the second datatag includes the originating computer ID, a first user computer ID for the first user computer, and the first task ID; and (3) identifying an N-th datatag by an Nth user computer, acquiring the originating computer ID, an N−1 computer ID, and the first task ID, performing the first operation, generating N-th execution data, wherein N is a integer greater than or equal to 2.

The method can further include:

(0) storing, by a first interface server, first application service information corresponding to the first task, and providing the first application service information to the originating computer, the first user computer, and the Nth user computer through a network.

The method can further include:

(4) storing the first user computer ID, first execution data, N-th computer ID, and N-th execution data by the first interface server.

The step (0) can further include:

using first interface server, by a first control server, to control the originating computer to publish the first datatag via the network.

The method can further include:

(5) generating and storing, by the first control server, a first operational index comprising at least the first user computer ID and the corresponding first execution data, and the Nth computer ID and the corresponding Nth execution data.

The second datatag further can further include first execution data, wherein the N-th datatag further comprises N−1-th execution data, wherein step (3) can further include executing the first operation by the N-th user computer based on the N−1-th execution data; and generating N-th execution data.

The N-th datatag can further include at least one X-th execution data, wherein X is an integer equal to or greater than 1, wherein step (3) can further include executing the first operation by the N-th user computer based on at least one of the X-th execution data and to generate N-th execution data.

The disclosed method can further include:

(2-1) identifying the n-th datatag by an n-th user computer, acquiring the origination computer ID, the (n−1)th computer ID, and the first task ID, executing a first operation corresponding to the first task, generating n-th execution data and generating an (n+1)-th datatag, the (n+1)-th datatag which includes at least the origination computer ID, n-th user computer ID, the first task ID, and the second task ID, wherein n is a integer greater than or equal to 2 and less than or equal to N;

(2-2) identifying the (n+1)-th datatag by an (n+1)-th user computer, acquiring the origination computer ID, the n-th computer ID, the first task ID, and the second task ID, generating a first operation corresponding to the first task, generating an (n+1)-th operation execution data, to execute a second operation corresponding to the second task, generating an (n+1)-th second operation execution data, the (n+2)-th datatag, the (n+2)-th datatag which includes at least the origination computer ID, the first (n+1)-th user computer ID, the first task ID, and the second task ID; and (2-3) storing, by a second interface server, second application service information corresponding to the second task and to provide the second application service information to the nth user computer and the (n+1)-th user computer through a network.

The method can further include:

(2-0) controlling the originating computer by a second control server to issue the second task ID through a network and using the second interface server; and (2-4) generating and storing a second operational index, the second operation index comprising the (n+1)-th user computer ID and the corresponding the (n+1)-th first operation execution data, and the (n+2)th first operation execution data.

In the presently disclosed multi-user cascade computer network and constructing method thereof, operations by multiple users are cascaded using the disclosed multi-user cascade computer network comprising an initiating computer and a plurality of user computers comprising a first user computer and an Nth user computer. A first data label is issued and transmitted by an originating computer. A first operation corresponding to a first task is executed by each user computer to generate and then store the execution data and generate an index. The first task is simultaneously cascaded. The subsequent user computers continue to generate nested datatags, so as to realize the function of each terminal to record the communications between the terminals in the specific application. The operation behavior of each user are recorded and reflected for the specific application, which facilitate follow-up data analyses and management, and big data applications. The disclosed multi-user operational cascade computer network and construction methods have a simple network structure, low application cost, and extensive range of applications.

DETAILED DESCRIPTION OF THE INVENTION

The disclosed invention can be more clearly understood with the following detailed descriptions of the following examples.

Figure 1:
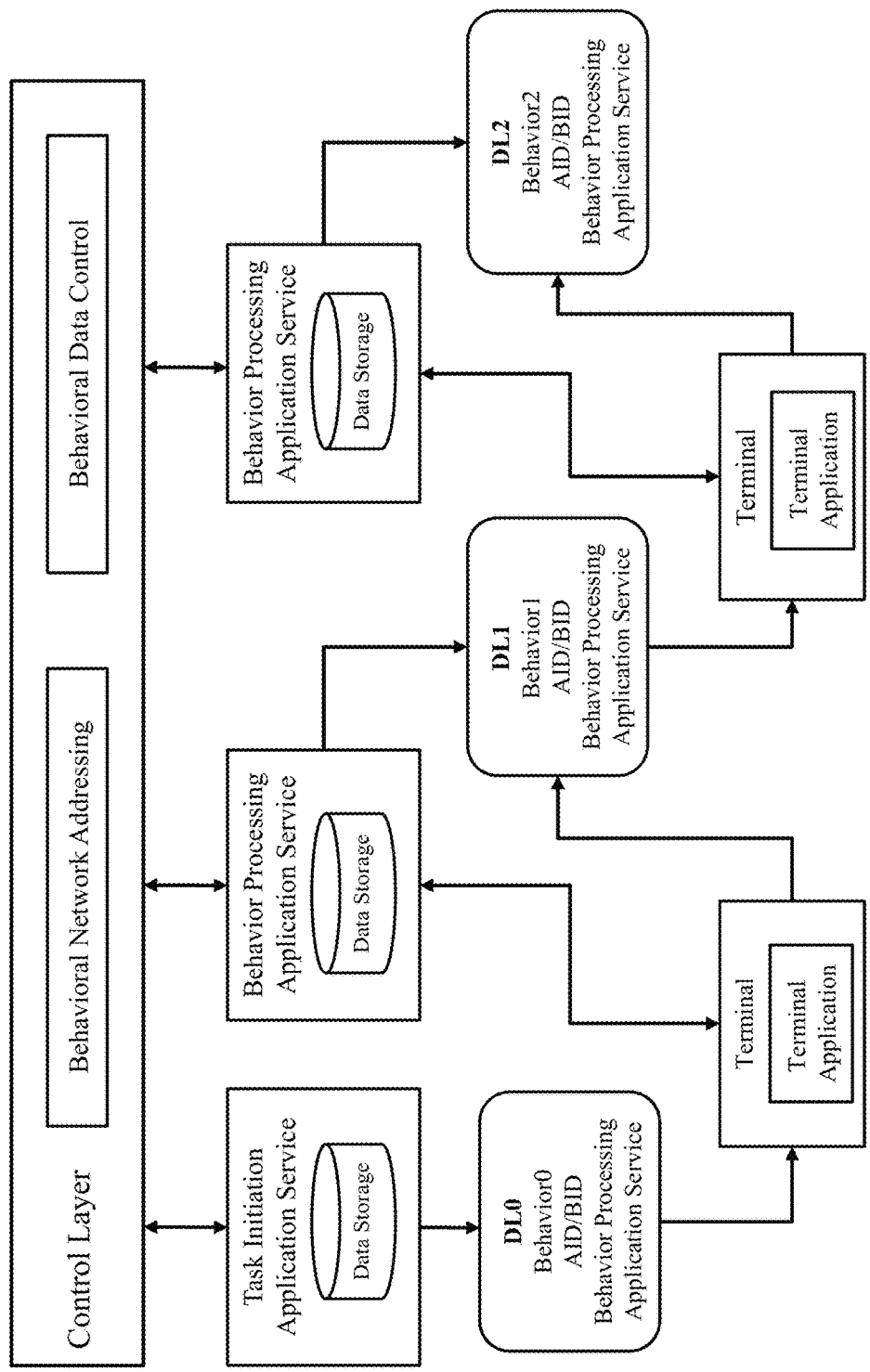
FIG. 1 is a schematic structural diagram for a multi-user cascade computer network in accordance with some embodiments of the present invention.

FIG. 1 shows a schematic structural diagram for a multi-user cascade computer network in accordance with some embodiments of the present invention.

In some embodiments, the disclosed multi-user cascade computer network includes an initiating computer and a plurality of user computers that includes at least a first user computer and an Nth user computer.

The initiating computer can issue a first datatag corresponding to a first task, wherein the first datatag includes at least an originating computer ID for the initiating computer and a first task ID for the first task.

The first user computer can identify the first datatag, to acquire the originating computer ID and the first task ID, to execute a first operation corresponding to the first task, to generate a first execution data, and to generate a second datatag, wherein the second datatag includes the originating computer ID, a first user computer ID for the first user computer, and the first task ID.

The Nth user computer can identify an N-th datatag. The N-th datatag, and the first datatag, the second datatag . . . form a collection of nested datatags which are issued by different computers (i.e. the initiating computer, user computers), and all point to the first task. The Nth user computer can acquire the originating computer ID, an N−1 computer ID, and the first task ID, to perform the first operation, to generate N-th execution data, wherein N is a integer greater than or equal to 2.

The present disclosure also describes a method for constructing a multi-user cascade computer network. The method can include the following steps:

(1) issuing a first datatag corresponding to a first task by an initiating computer, wherein the first datatag includes at least an originating computer ID for the initiating computer and a first task ID for the first task;

(2) identifying the first datatag by a first user computer, acquiring the originating computer ID and the first task ID, executing a first operation corresponding to the first task, generating a first execution data, and generating a second datatag, wherein the second datatag includes the originating computer ID, a first user computer ID for the first user computer, and the first task ID; and (3) identifying an N-th datatag by an Nth user computer, acquiring the originating computer ID, an N−1 computer ID, and the first task ID, performing the first operation, generating N-th execution data, wherein N is a integer greater than or equal to 2.

As described above, with transmission of nested datatags, the first user computer to the Nth user computer are structured in a cascade relationship in a computer network to jointly execute a first task. Here, the computers can include personal computers, mobile phones, tablet, ATM, cash registers, public displays, and other devices that can access to the Internet to accomplish achieve appropriate operations.

In some embodiments, the disclosed method can further include the following steps:

(0) storing, by a first interface server, first application service information corresponding to the first task, and providing the first application service information to the originating computer, the first user computer, and the Nth user computer through a network; and (4) storing the first user computer ID, first execution data, N-th computer ID, and N-th execution data by the first interface server.

The multi-user cascade computer network can further include a first control server configured to use first interface server to control the originating computer to publish the first datatag via the network.

The step (0) can further include:

using first interface server, by a first control server, to control the originating computer to publish the first datatag via the network.

In some embodiments, the first control server can further generate and store a first operational index comprising at least the first user computer ID and the corresponding first execution data, and the Nth computer ID and the corresponding Nth execution data. The first control server can further control the originating computer to suspend publication of the first datatag. The first control server can further control the initiating computer to modify the first datatag.

In some embodiments, the disclosed method can further include the following steps:

(5) generating and storing, by the first control server, a first operational index comprising at least the first user computer ID and the corresponding first execution data, and the Nth computer ID and the corresponding Nth execution data.

In some embodiments, the second datatag further can further include first execution data, wherein the N-th datatag further comprises N−1-th execution data, wherein step (3) can further include executing the first operation by the N-th user computer based on the N−1-th execution data; and generating N-th execution data.

The N-th datatag can further include at least one X-th execution data, wherein X is an integer equal to or greater than 1. The N-th datatag has a nested data relationship with the X-th datatag.

wherein step (3) can further include executing the first operation by the N-th user computer based on at least one of the X-th execution data and to generate N-th execution data.

In some embodiments, an n-th user computer can identify the n-th datatag, to acquire the origination computer ID, the (n−1)th computer ID, and the first task ID, to execute a first operation corresponding to the first task, to generate n-th execution data and to generate an (n+1)-th datatag, the (n+1)-th datatag which includes at least the origination computer ID, n-th user computer ID, the first task ID, and the second task ID, wherein n is a integer greater than or equal to 2 and less than or equal to N.

An (n+1)-th user computer can identify the (n+1)-th datatag, to acquire the origination computer ID, the n-th computer ID, the first task ID, and the second task ID, to generate a first operation corresponding to the first task, to generate an (n+1)-th operation execution data, to execute a second operation corresponding to the second task, to generate an (n+1)-th second operation execution data, the (n+2)-th datatag, the (n+2)-th datatag which includes at least the origination computer ID, the first (n+1)-th user computer ID, the first task ID, and the second task ID.

A second interface server can store second application service information corresponding to the second task and to provide the second application service information to the nth user computer and the (n+1)-th user computer through a network.

The disclosed method can further include:

(2-1) identifying the n-th datatag by an n-th user computer, acquiring the origination computer ID, the (n−1)th computer ID, and the first task ID, executing a first operation corresponding to the first task, generating n-th execution data and generating an (n+1)-th datatag, the (n+1)-th datatag which includes at least the origination computer ID, n-th user computer ID, the first task ID, and the second task ID, wherein n is a integer greater than or equal to 2 and less than or equal to N;

(2-2) identifying the (n+1)-th datatag by an (n+1)-th user computer, acquiring the origination computer ID, the n-th computer ID, the first task ID, and the second task ID, generating a first operation corresponding to the first task, generating an (n+1)-th operation execution data, to execute a second operation corresponding to the second task, generating an (n+1)-th second operation execution data, the (n+2)-th datatag, the (n+2)-th datatag which includes at least the origination computer ID, the first (n+1)-th user computer ID, the first task ID, and the second task ID; and (2-3) storing, by a second interface server, second application service information corresponding to the second task and to provide the second application service information to the nth user computer and the (n+1)-th user computer through a network.

In view of the above, a second task can be derived from the cascade computer network, which is composed of nested datatags associated with the first task. Moreover, the disclosed system and method can further derive third, fourth, and more tasks.

In some embodiments, the multi-user cascade computer network can further include a second control server configured to control the originating computer to issue the second task ID through a network and using the second interface server, and to generate and store a second operational index, the second operation index comprising the (n+1)-th user computer ID and the corresponding the (n+1)-th first operation execution data, and the (n+2)th first operation execution data.

The method can further include:

(2-0) controlling the originating computer by a second control server to issue the second task ID through a network and using the second interface server; and (2-4) generating and storing a second operational index, the second operation index comprising the (n+1)-th user computer ID and the corresponding the (n+1)-th first operation execution data, and the (n+2)th first operation execution data.

In practice, the disclosed multi-user cascade computer network, shown in FIG. 1, can include the following functions:

1. Task Initiation

The task initiates an application service, requests a data label (DL) or datatag to initiate a task through the control layer, DL includes corresponding operation processing APPID/AID (application ID)/BID (behavior ID) and other key UID.

2. Task Execution

After the application terminal receives the DL, the terminal application of the operation processing service is executed by the APPID stored in the DL. The corresponding operation (behavior processing) is selected by the end user according to the definition in the DL.

The result of the operation of the terminal application is recorded and stored by the application service and, if necessary, the application service is requested and issued.

Repeat the above process, the implementation of the task to continue.

3. Suspension of the Task

The task initiates the application service to define or apply for the validity period of the DL at any time. When the initiated DL fails, the entire operation calculation task (including the subtask) is aborted.

4. Additional Tasks

A participating application service can attach to follow-up tasks based on needs.

5. Modifying Tasks

The task initiator initiates a main task or additional tasks, and can modify task parameters at any time, thus changing the goal of data collection.

6. Centralized Operation

In the entire operation of the task, only a single DL is issued to complete a single task. Typical applications: questionnaires are published on each website.

7. Decentralized Operation

Through the entire operation task, each application service is allowed to issue respective subsequent DL so that the tasks defined by the parent DL can continue to be executed. Typical application: temperature collections in logistics distribution business; the analysis of receiving channels in the process of consumption behavior.

8. Mixed Operation

In a task, centralized operations and decentralized operations can be combined as needed.

Figure 2:
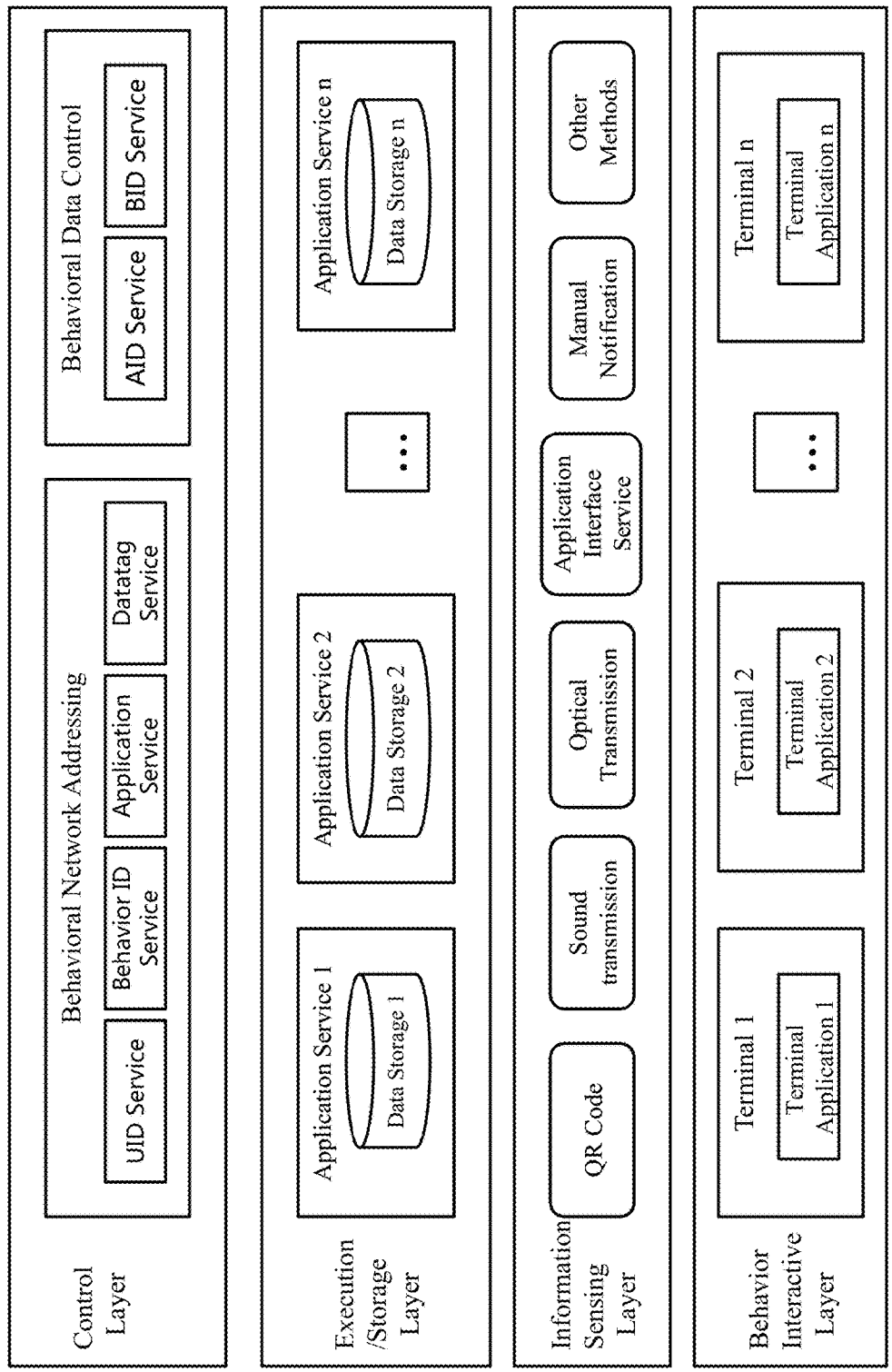
FIG. 2 is a schematic structural diagram for the network layers of a multi-user cascade computer network in accordance with some embodiments of the present invention.

In practical applications, a hierarchical structure of the multi-user cascade computer network in accordance with some embodiments of the present invention is shown in FIG. 2, which includes a control layer, an execution/storage layer, an information sensing layer, and a behavior interaction layer.

The control layer is the core service layer of the whole behavior computing device network, and its role is similar to that of the traditional computer CPU.

Behavioral network addressing includes the following features:

UID service: assign unique identities to devices, people, or organizations that participate in the behavioral computing device network, as well as other entities or virtual objects.

Behavior ID Service: record the ID of the occurrence of the behavior.

Application ID service: participating in the behavior of computing equipment network management services, registering the corresponding URL/IP, package downloading address, and defining and managing application of the service permissions.

Through these IDs, the registered application services, hardware devices, people or organizations, and other object data are located by addresses.

The application service in the storage layer is executed through behavior data control services, by accessing and publishing BID and AID, initiating the behavior computing equipment network, and implementing behavior of data tracking. The storage layer is implemented similar to CPU and memory in computer structures, and is responsible for the independent completion of a processing logic.

In the behavior computing device network, each application service is separate execution logic and has its own memory. Each application service is responsible for completing the specific transaction or processing logic of its application service definition. The application service independently stores the data associated with the application service. By invoking the control layer of the behavior computing device network, the application service can protect the data and even the procedures of other application services within the scope of permission. Application services can also be addressed by computing the network control layer, find other application services, and according to the agreement between the communication, and other applications to complete the coordination. The storage and processing result of the application service must be associated with the behavior ID data stored in the behavior computing device network through the behavior ID, to complete the processing of the behavior computing device network.

The information sensing layer contains various means of interacting with the terminal device through QR codes, sound media, optical media, and application service interfaces. The application service issues the DL at the perceptual layer. Through the information sensing layer, a user uses a terminal device to sense the DL, and then completes the behaviors defined in the DL, and returns the result to the storage service.

The behavioral interaction layer is similar to the intelligent IO device in a computer structure, which is responsible for the interactive task of data acquisition and behavior data. An intelligent device capable of data acquisition and interaction can perform as a terminal for the behavioral interaction layer. The behavior interaction layer executes the pre-installed APP as needed, or dynamically obtains and executes the corresponding APP from the control layer in the behavior computing device network according to the result of the data acquisition, to complete the task step specified by the end user or the previous task. It transmits the result back to the corresponding storage to complete the behavior of the data records.

Figure 3:
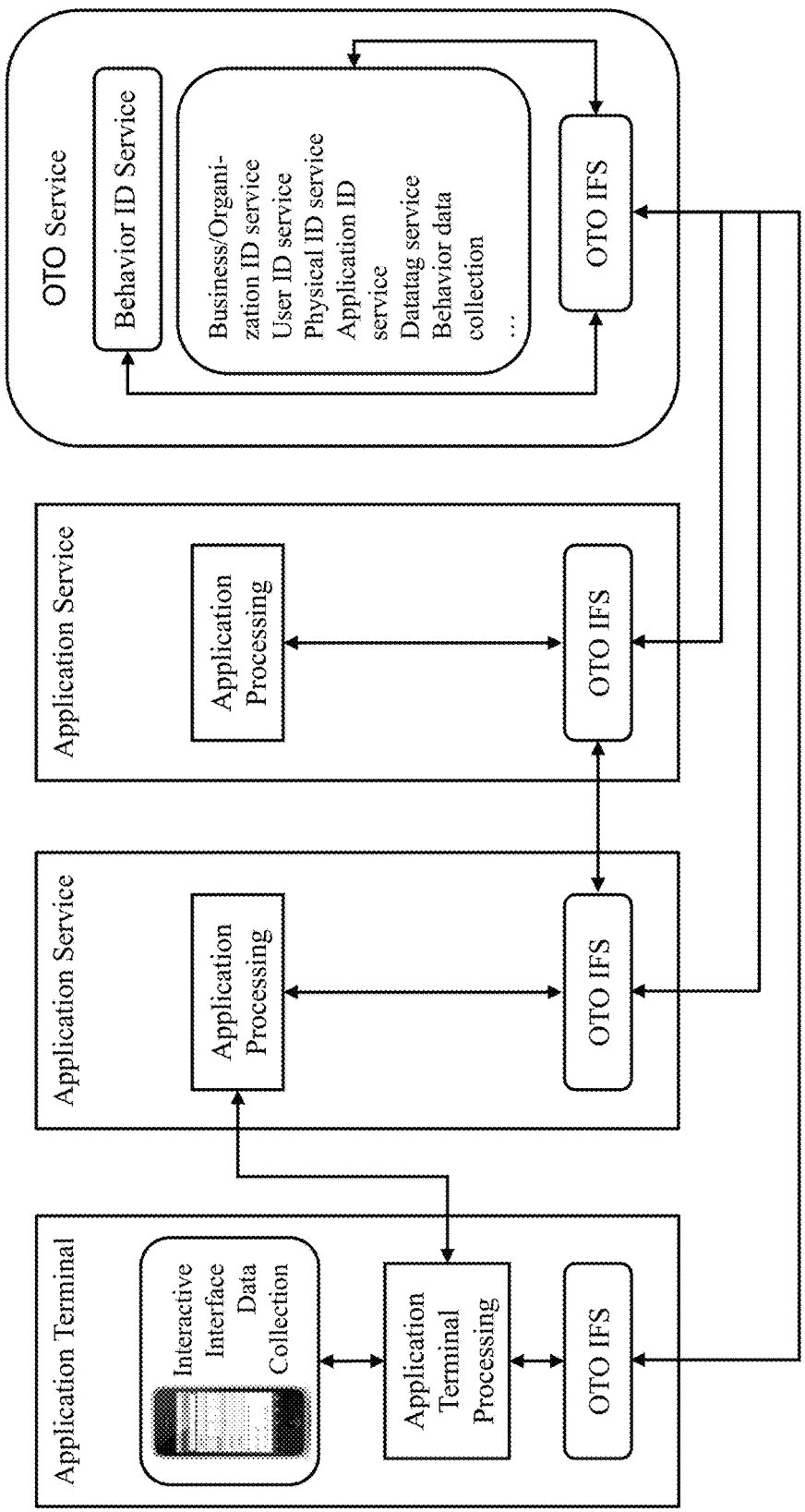
FIG. 3 is a schematic diagram for the application structure of an interface server in a multi-user cascade computer network in accordance with some embodiments of the present invention.

The application structure of the interface server in the disclosed multi-user operation cascade computer network is shown in FIG. 3.

The interface server is the standard interface between the application terminal and the application service and data exchange.

Through the interface server, the application terminal, application services to obtain the application platform to provide the services, such as registration/modify UID information, transmitting code, decoding, and behavior verification and recording. The interface server provides cross-platform SDK, to achieve data communication between different platforms docking. The interface server provides data encryption services to ensure the communication data security of the application service. A mobile device in the interface server can provide disconnection data cache function. When the communication line is restored, the cache data will be automatically sent to the application service platform. All functions of the application service platform are open to the application service or application terminal only through the interface server to ensure the security of the platform data.

Implementation Example 1 for Multi-User Operations in a Cascade Computer Network When a new customer to shop, he or she only needs to use a phone to connect the store's wireless router, or use mobile phone to scan a shop dedicated QR code displayed at the store to obtain the store's information, enter the customer's own identity information, to produce a dedicated two-dimensional code comprising identity information for the customer. A shop terminal can scan the user's two-dimensional code to obtain the customer's identity information, and then to conduct membership maintenance and other operations. The shop dedicated QR code can be an encrypted private code, which the user device needs to decode using a dedicated mobile client APP. The shop terminal can also display a mobile client APP corresponding to the two-dimensional code (code), to allow user device to download the mobile client APP. The store's wireless router can provide free services to the customer's mobile phone (including information such as those for downloading the mobile client APP). A charging model can be used to provide unlimited Internet services to the customer phone.

Implementation Example 2 for Multi-User Operations in a Cascade Computer Network The difference from the new customer application is that the previous user (upstream customer) can display her dedicated two-dimensional code for the next user (downstream customer) to scan, and the next user's newly generated personal dedicated two-dimensional code can include store information and the user information (the next user), and can also include information about upstream customer to facilitate the shop to record information transmission channels and give members appropriate feedback.

Implementation Example 3 for Multi-User Operations in a Cascade Computer Network When a courier receive an order, the courier uses an order terminal to input sender and recipient information, and then use a handheld printer to print two-dimensional code (also can be other types of bar code). The two-dimensional code is generated using encryption technologies, which includes information about the sender, the recipient, and the goods. The courier attaches the printed two-dimensional code to the goods, which replaces paper bills of lading. The encrypted two-dimensional code on the goods does not include text, which substantially increases information security. The courier dispatcher can use the dispatch terminal to read and decode the encrypted two-dimensional code (the first operation) to obtain the recipient and other information, and then deliver the courier. The recipient can electronically sign on the dispatch terminal (the second operations) to receive the courier.

Implementation Example 4 for Multi-User Operations in a Cascade Computer Network Electronic currency transactions can be carried out using the disclosed multi-user by the cascade computer network and associated construction method. An electronic currency transaction is defined as a "behavior" in multi-user cascade computer network. When a user completes the electronic currency transaction, a new datatag is generated, which equivalent to the generation of a block in ledgering an electronic currency transaction. A behavioral index associated with electronic currency aggregates is generated by the control server for all electronic currency transactions. Thus data storage is effectively decentralized, which ensures security of electronic currency transactions at the data level.

In the presently disclosed multi-user cascade computer network and constructing method thereof, operations by multiple users are cascaded using the disclosed multi-user cascade computer network comprising an initiating computer and a plurality of user computers comprising a first user computer and an Nth user computer. A first data label is issued and transmitted by an originating computer. A first operation corresponding to a first task is executed by each user computer to generate and then store the execution data and generate an index. The first task is simultaneously cascaded. The subsequent user computers continue to generate nested datatags, so as to realize the function of each terminal to record the communications between the terminals in the specific application. The operation behavior of each user are recorded and reflected for the specific application, which facilitate follow-up data analyses and management, and big data applications. The disclosed multi-user operational cascade computer network and construction methods have a simple network structure, low application cost, and extensive range of applications.

In the present specification, the present invention has been described with specific examples. However, it should be noted that various modifications and variations may be made without departing from the spirit and scope of the invention. Accordingly, the specification and drawings are to be regarded for illustrative rather than restrictive purposes.

What is claimed is:

1. A multi-user cascade computer network, comprising:
    an initiating computer configured to issue a first datatag corresponding to a first task, wherein the first datatag includes at least an originating computer ID for the initiating computer and a first task ID for the first task; and
    a plurality of user computers, comprising:
        a first user computer configured to identify the first datatag, to acquire the originating computer ID and the first task ID, to execute a first operation corresponding to the first task, to generate a first execution data, and to generate a second datatag, wherein the second datatag includes the originating computer ID, a first user computer ID for the first user computer, and the first task ID; and
        an Nth user computer configured to identify an N-th datatag, to acquire the originating computer ID, an N−1 computer ID, and the first task ID, to perform the first operation, to generate N-th execution data, wherein N is a integer greater than or equal to 2.

2. The multi-user cascade computer network of claim 1, further comprising:
    a first interface server configured to store first application service information corresponding to the first task and to provide the first application service information to the originating computer, the first user computer, and the Nth user computer through a network.

3. The multi-user cascade computer network of claim 2, wherein the first interface server is configured to store the first user computer ID, first execution data, N-th computer ID, and N-th execution data.

4. The multi-user cascade computer network of claim 2, further comprising:
    a first control server configured to use first interface server to control the originating computer to publish the first datatag via the network.

5. The multi-user cascade computer network of claim 4, wherein the first control server is further configured to generate and store a first operational index comprising at least the first user computer ID and the corresponding first execution data, and the Nth computer ID and the corresponding Nth execution data.

6. The multi-user cascade computer network of claim 4, wherein the first control server is further configured to control the originating computer to suspend publication of the first datatag.

7. The multi-user cascade computer network of claim 4, wherein the first control server is further configured to control the initiating computer to modify the first datatag.

8. The multi-user cascade computer network of claim 1, wherein the second datatag further comprises first execution data, wherein the N-th datatag further comprises N−1-th execution data, wherein the N-th user computer is configured to execute the first operation based on the N−1-th execution data and to generate N-th execution data.

9. The multi-user cascade computer network of claim 1, wherein the N-th datatag further comprises at least one X-th execution data, wherein X is an integer equal to or greater than 1, wherein the N-th user computer is configured to execute the first operation based on at least one of the X-th execution data and to generate N-th execution data.

10. The multi-user cascade computer network of claim 1, further comprising:
    an n-th user computer configured to identify the n-th datatag, to acquire the origination computer ID, the (n−1)th computer ID, and the first task ID, to execute a first operation corresponding to the first task, to generate n-th execution data and to generate an (n+1)-th datatag, the (n+1)-th datatag which includes at least the origination computer ID, n-th user computer ID, the first task ID, and the second task ID, wherein n is a integer greater than or equal to 2 and less than or equal to N;
    an (n+1)-th user computer configured to identify the (n+1)-th datatag, to acquire the origination computer ID, the n-th computer ID, the first task ID, and the second task ID, to generate a first operation corresponding to the first task, to generate an (n+1)-th operation execution data, to execute a second operation corresponding to the second task, to generate an (n+1)-th second operation execution data, the (n+2)-th datatag, the (n+2)-th datatag which includes at least the origination computer ID, the first (n+1)-th user computer ID, the first task ID, and the second task ID; and
    a second interface server configured to store second application service information corresponding to the second task and to provide the second application service information to the nth user computer and the (n+1)-th user computer through a network.

11. The multi-user cascade computer network of claim 10, further comprising:
    a second control server configured to control the originating computer to issue the second task ID through a network and using the second interface server, and to generate and store a second operational index, the second operation index comprising the (n+1)-th user computer ID and the corresponding the (n+1)-th first operation execution data, and the (n+2)th first operation execution data.

12. A method for constructing a multi-user cascade computer network, comprising:
    (1) issuing a first datatag corresponding to a first task by an initiating computer, wherein the first datatag includes at least an originating computer ID for the initiating computer and a first task ID for the first task;
    (2) identifying the first datatag by a first user computer, acquiring the originating computer ID and the first task ID, executing a first operation corresponding to the first task, generating a first execution data, and generating a second datatag, wherein the second datatag includes the originating computer ID, a first user computer ID for the first user computer, and the first task ID; and
(3) identifying an N-th datatag by an Nth user computer, acquiring the originating computer ID, an N−1 computer ID, and the first task ID, performing the first operation, generating N-th execution data, wherein N is a integer greater than or equal to 2.

13. The method of claim 12, further comprising:
(0) storing, by a first interface server, first application service information corresponding to the first task, and providing the first application service information to the originating computer, the first user computer, and the Nth user computer through a network.

14. The method of claim 13, further comprising:
(4) storing the first user computer ID, first execution data, N-th computer ID, and N-th execution data by the first interface server.

15. The method of claim 13, wherein step (0) further comprises:
using first interface server, by a first control server, to control the originating computer to publish the first datatag via the network.

16. The method of claim 15, further comprising:
(5) generating and storing, by the first control server, a first operational index comprising at least the first user computer ID and the corresponding first execution data, and the Nth computer ID and the corresponding Nth execution data.

17. The method of claim 12, wherein the second datatag further comprises first execution data, wherein the N-th datatag further comprises N−1-th execution data,
wherein step (3) further comprises:
executing the first operation by the N-th user computer based on the N−1-th execution data; and
generating N-th execution data.

18. The method of claim 12, wherein the N-th datatag further comprises at least one X-th execution data, wherein X is an integer equal to or greater than 1,
wherein step (3) further comprises:
executing the first operation by the N-th user computer based on at least one of the X-th execution data and to generate N-th execution data.

19. The method of claim 12, further comprising:
(2-1) identifying the n-th datatag by an n-th user computer, acquiring the origination computer ID, the (n−1)th computer ID, and the first task ID, executing a first operation corresponding to the first task, generating n-th execution data and generating an (n+1)-th datatag, the (n+1)-th datatag which includes at least the origination computer ID, n-th user computer ID, the first task ID, and the second task ID, wherein n is a integer greater than or equal to 2 and less than or equal to N;
(2-2) identifying the (n+1)-th datatag by an (n+1)-th user computer, acquiring the origination computer ID, the n-th computer ID, the first task ID, and the second task ID, generating a first operation corresponding to the first task, generating an (n+1)-th operation execution data, to execute a second operation corresponding to the second task, generating an (n+1)-th second operation execution data, the (n+2)-th datatag, the (n+2)-th datatag which includes at least the origination computer ID, the first (n+1)-th user computer ID, the first task ID, and the second task ID; and
(2-3) storing, by a second interface server, second application service information corresponding to the second task and to provide the second application service information to the nth user computer and the (n+1)-th user computer through a network.

20. The method of claim 12, further comprising:
(2-0) controlling the originating computer by a second control server to issue the second task ID through a network and using the second interface server; and
(2-4) generating and storing a second operational index, the second operation index comprising the (n+1)-th user computer ID and the corresponding the (n+1)-th first operation execution data, and the (n+2)-th first operation execution data.

* * * * *